(12) United States Patent
Ostermaier et al.

(10) Patent No.: US 10,641,365 B2
(45) Date of Patent: May 5, 2020

(54) GUIDE RAIL OR CLAMPING RAIL WITH A LOCKABLE SLIDEWAY LINING

(71) Applicant: SCHAEFFLER TECHNOLOGIES AG & CO. KG, Herzogenaurach (DE)

(72) Inventors: Klaudyna Ostermaier, Baiersdorf (DE); Christopher Krawietz, Lauf a.d. Pegnitz (DE); Yvonne Pech, Weisendorf (DE)

(73) Assignee: SCHAEFFLER TECHNOLOGIES AG & CO. KG., Herzogenaurach (DE)

( * ) Notice: Subject to any disclaimer, the term of this patent is extended or adjusted under 35 U.S.C. 154(b) by 374 days.

(21) Appl. No.: 15/323,556

(22) PCT Filed: Apr. 29, 2015

(86) PCT No.: PCT/DE2015/200287
§ 371 (c)(1),
(2) Date: Jan. 3, 2017

(87) PCT Pub. No.: WO2016/000701
PCT Pub. Date: Jan. 7, 2016

(65) Prior Publication Data
US 2017/0146101 A1    May 25, 2017

(30) Foreign Application Priority Data
Jul. 2, 2014   (DE) .................. 10 2014 212 756

(51) Int. Cl.
*F16H 7/18*        (2006.01)
*F16H 7/08*        (2006.01)

(52) U.S. Cl.
CPC ....... *F16H 7/18* (2013.01); *F16H 2007/0872* (2013.01); *F16H 2007/185* (2013.01)

(58) Field of Classification Search
CPC .............. F16H 2007/0872; F16H 7/18; F16H 2007/0893; F16H 7/08; F01L 1/024
(Continued)

(56) References Cited

U.S. PATENT DOCUMENTS 5,184,983 A * 2/1993 Shimaya ............... F16H 7/08
                                                     474/111
5,820,502 A * 10/1998 Schulze .................. F01L 1/024
                                                     474/140
(Continued)

FOREIGN PATENT DOCUMENTS

CN          1807928 A        7/2006
CN          1831374 A        9/2006
(Continued)

OTHER PUBLICATIONS

First Office Action for Chinese Application No. 201580035700.7, dated Jun. 5, 2018, 6 pages.
(Continued)

Primary Examiner — Henry Y Liu
(74) Attorney, Agent, or Firm — Brooks Kushman P.C.

(57) ABSTRACT

A guiderail for a traction drive comprising a supporting body including a first surface with a recess that includes a first corresponding cavity. The guiderail further includes a slideway lining configured to contact the first surface, wherein the slideway lining includes a second surface that includes a locking hook that is formed on a first edge of the second surface and protrudes out from the first surface, wherein the locking hook is configured to engage with the recess to prevent the slideway lining from slipping off the supporting body.

18 Claims, 1 Drawing Sheet

(58) Field of Classification Search
USPC .......................................................... 474/111
See application file for complete search history.

(56) References Cited

U.S. PATENT DOCUMENTS

| | | | | |
|---|---|---|---|---|
| 6,612,952 | B1* | 9/2003 | Simpson | F16H 7/08 |
| | | | | 474/111 |
| 6,758,777 | B2* | 7/2004 | Young | F16H 7/18 |
| | | | | 474/111 |
| 6,939,259 | B2* | 9/2005 | Thomas | F16H 7/18 |
| | | | | 474/111 |
| 7,476,169 | B2* | 1/2009 | Konno | F16H 7/18 |
| | | | | 474/111 |
| 7,524,254 | B2* | 4/2009 | Konno | F16H 7/18 |
| | | | | 474/111 |
| 7,951,029 | B2* | 5/2011 | Oota | F16H 7/18 |
| | | | | 474/111 |
| 7,967,708 | B2* | 6/2011 | Hayami | F16H 7/18 |
| | | | | 474/111 |
| 8,747,263 | B2* | 6/2014 | Konno | F16H 7/18 |
| | | | | 474/111 |
| 8,888,628 | B2 | 11/2014 | Konno et al. | |
| 2002/0061799 | A1* | 5/2002 | Young | F16H 7/18 |
| | | | | 474/111 |
| 2009/0036242 | A1* | 2/2009 | Hayami | F16H 7/18 |
| | | | | 474/111 |
| 2013/0035184 | A1* | 2/2013 | Konno | F16H 7/18 |
| | | | | 474/111 |

FOREIGN PATENT DOCUMENTS

| | | |
|---|---|---|
| CN | 102913599 A | 2/2013 |
| DE | 19851601 A1 | 5/2000 |
| DE | 102005062531 A1 | 7/2006 |
| DE | 102008028206 A1 | 2/2009 |
| GB | 2424053 A | 9/2006 |

OTHER PUBLICATIONS

International Search Report for International Application No. PCT/DE2015/200287 dated Aug. 25, 2015.

* cited by examiner

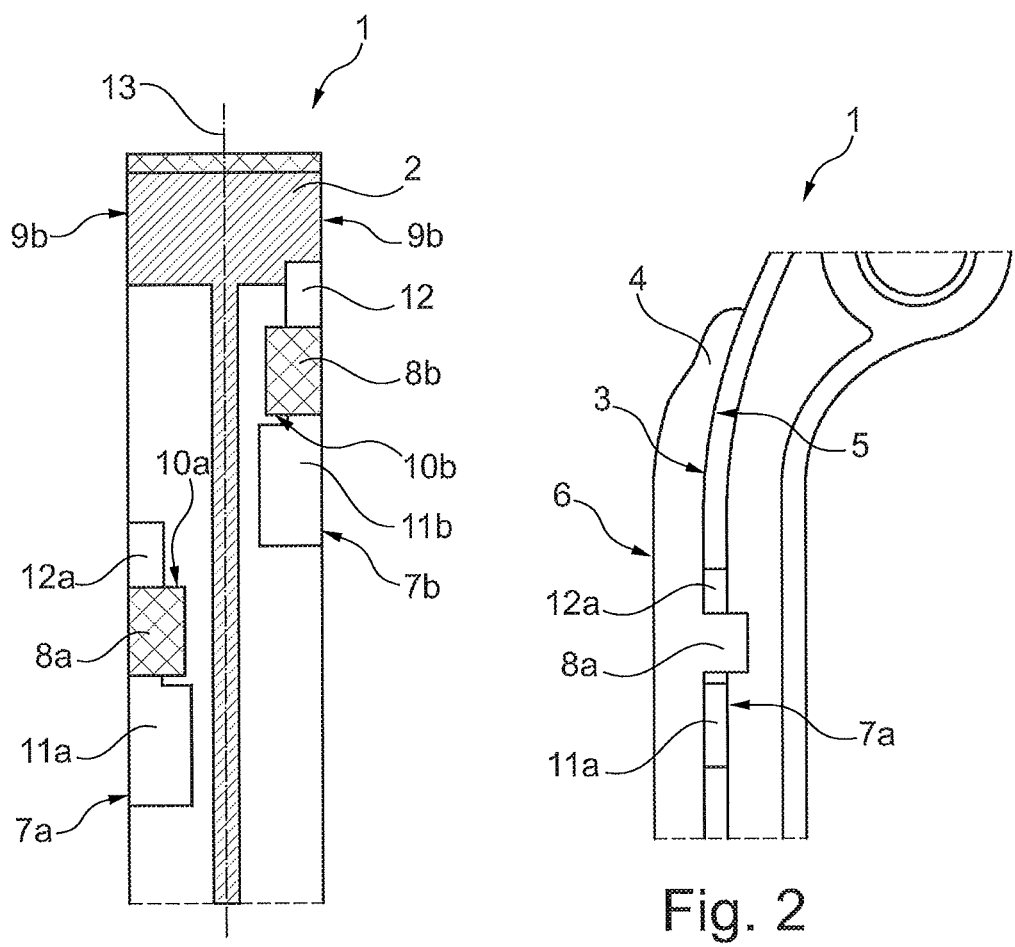
Fig. 1
Fig. 2
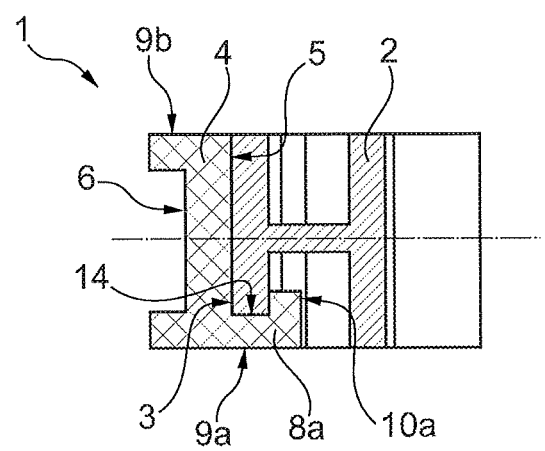
Fig. 3

GUIDE RAIL OR CLAMPING RAIL WITH A LOCKABLE SLIDEWAY LINING

CROSS-REFERENCE TO RELATED APPLICATIONS

This application is the U.S. National Phase of PCT Appln. No. PCT/DE2015/200287 filed Apr. 29, 2015, which claims priority to DE 102014212756.4 filed Jul. 2, 2014, the entire disclosures of which are incorporated by reference herein.

TECHNICAL FIELD

The present disclosure relates to a guide rail or clamping rail for a traction drive, comprising a supporting body with an active surface and a slideway lining which is arranged on the supporting body. The slideway lining includes a basic surface for contact with the active surface and an opposite slideway surface provided for contact with a traction mechanism, wherein the supporting body has at least one recess for receiving at least one locking hook, which is formed on the slideway lining so as to prevent the slideway lining from slipping laterally and from being lifted off the supporting body.

BACKGROUND

The field of application of the present disclosure relates to internal combustion engines, which make use of a traction drive. Traction drives use a traction mechanism to transfer torque from a first shaft to a second shaft. For an effective and low-wear operation, the traction mechanism may be kept under tension by using a force-actuated guide rail (also known as clamping rail), which has a slideway lining, in order to avoid, among other things, vibrations of the traction mechanism vertically to the direction of movement. In this way, it is also possible to compensate manufacturing tolerances of the length of the traction mechanism, as well as extensions of the traction mechanism resulting from use. Furthermore, guide rails, which can also have a slideway lining, are used for additional positioning of the traction mechanism.

Because of the friction the traction mechanism is exerting on the slideway lining, provisions may be made to prevent the slideway lining from slipping in the direction of movement of the traction mechanism. It may be known to those of skill in the art that the end of the supporting body in opposite direction of movement is provided, for example, with a form-fitting wrap-around portion of the slideway lining in order to prevent the slideway lining from slipping in the direction of movement.

DE 10 2008 028 206 A1 discloses a clamping rail in which the active surface of the supporting body is provided with a depression, which is arranged laterally in the center and into which a projection located on the bottom of the slideway lining can be engaged. In particular, the depression and the projection have contact surfaces abutting each other, thus preventing the slideway lining from slipping. The clamping rail also comprises a C-shaped hook, which is designed adjacent to a chain outlet portion of the slideway lining, wherein the C-shaped hook extends vertically to direction of longitudinal extension of the slideway lining and the hook can receive a lateral edge of the supporting body. Thus, the depression and the projection prevent the slideway lining from slipping, wherein the C-shaped hook prevents the slideway lining from being lifted. However, these supporting elements impede the assembly of the slideway lining to and disassembly from the supporting body.

SUMMARY

Therefore, an embodiment of the present disclosure has the objective of further developing a guide rail, which simplifies the assembly of the slideway lining to and disassembly from the supporting body.

According to an embodiment of the present disclosure, at least one first locking hook is formed on a first edge of the basic surface of the slideway lining, and at least one second locking hook is formed on a second, opposite edge of the basic surface of the slideway lining, wherein the at least two locking hooks each have an undercut which interacts in a form-fitting manner with the respective recess on the supporting body in order to prevent the slideway lining also from being lifted off the supporting body. In other words, the slideway lining comprises at its lateral edges, which extend in longitudinal direction, at least one locking hook, respectively. The respective locking hook interacts with the respective recess in such a way that the slideway lining is connected in form-fitting manner with the supporting body.

An embodiment may include that the respective recess includes at least two differently sized cavities, which are connected with one another, wherein a respective first cavity has at least the same size as the undercut of the respective locking hook and a respective second cavity is smaller than the undercut of the respective locking hook. Thus, the respective recess consists of a large cavity, which corresponds to the undercut of the respective locking hook so that the respective locking hook can be guided through the first cavity, and a small cavity which ensures that the locking hook is prevented from passing through.

The slideway lining can be positioned axially on the active surface of the supporting body, wherein the at least two locking hooks penetrate the respective first cavity simultaneously, and wherein also a form-fitting engagement between the supporting body and the slideway ling can be implemented by means of an axial displacement of the slideway lining on the supporting body in the direction of the respective second cavity. This cannot only be attributed to the differently sized cavities but also to the locking hook, which has an L-shaped design and therefore encompasses at least partially the active surface of the supporting body. In other words, the locking hook is formed like a longitudinal groove in a lateral surface of the slideway lining, which exactly receives the supporting body at least partially. Because of the fact that the supporting body is encompassed, the slideway ling is secured against unintentional slipping and lifting.

In one embodiment, at least two locking hooks are arranged in longitudinally displaced manner along a slideway lining. Accordingly, the corresponding recesses are also arranged in longitudinally displaced manner along the slideway lining. In particular, this counteracts a weakening of the cross section of the supporting body. Furthermore, this also involves production benefits and increases the stability of the slideway lining on the supporting body.

The supporting body is manufactured from metal or polymer material. Furthermore, the slideway lining is produced in an injection molding process from polymer material.

However, it is also possible to use different production methods, for example, machining processes.

An alternate embodiment may include at least two locking hooks and at least two recesses that are formed identically. Therefore, the geometry and dimensions of the first locking hook may correspond to the geometry and dimensions of the second locking hook. Similarly, the dimensions and geometries of the two recesses may also be identical.

BRIEF DESCRIPTION OF THE DRAWINGS

Further embodiments are subsequently described in more detail by means of the figures together with the description of a preferred embodiment. It is shown:

FIG. 1 a longitudinal section view of a guide rail with two locking hooks which engage in recesses, FIG. 2 a perspective view of the guide rail according to FIG. 1, and FIG. 3 a cross section view of the guide rail according to FIG. 1.

DETAILED DESCRIPTION

According to FIGS. 1 to 3, a guide rail 1 comprises a supporting body 2 with an active surface 3. A slideway lining 4 with a basic surface 5 is arranged on the active surface 3. Opposite to the basic surface 5 is a slideway lining 4 that includes a slideway surface 6. The basic surface 5 is in contact with a traction mechanism (not shown), particularly a chain. To secure the slideway lining 4 on the supporting body 2, the slideway lining 4 may include two locking hooks 8a, 8b, which are respectively formed on a first and a second edge 9a, 9b of the basic surface 5 of the slideway lining 4. The two locking hooks 8a, 8b may have a L-shaped design and include a respective undercut 10, 10b partially on the active surface 3 of the supporting body 2.

The slideway lining 4 is assembled on the supporting body 2 via a respective recess 7a, 7b, which is formed correspondingly to the locking hooks 8a, 8b and may include differently sized cavities 11a, 11b, 12a, 12b. The two cavities 11a, 12a may be connected with one another and thus form recess 7a. Furthermore, the two cavities 11b, 12b are also connected with one another and thus form recess 7b.

The respective first cavity 11a, 11b may be transverse to a longitudinal axis 13 of the guide rail 1 at the same size as the respective undercut 10a, 10b of the respective locking hook 8a, 8b and the second cavity 12a, 12b may be transverse to the longitudinal axis 13 of the guide rail smaller than the undercut 12a, 12b of the respective locking hook 8a. This may allow for a simultaneous penetration of both locking hooks 8a, 8b into the respective first cavity 11a, 11b when positioning the slideway lining 4 on the supporting body 2. Displacing the slideway lining 4 on the supporting body 2 in the direction of the second cavities 12a, 12b results in a form-fitting engagement between the supporting body 2 and the slideway lining 4. At the same time, the two locking hooks 8a, 8b encompass with the respective undercuts 10a, 10b and a portion of the active surface 3 of the supporting body 2, thus preventing the slideway lining 4 from slipping or being lifted off the supporting body 2. In other words, by displacing the slideway lining 4 in longitudinal direction on the supporting body 2, the respective locking hooks penetrate a respective groove 14.

The sliding rail 4 may be disassembled from the supporting body 2 by displacing the slideway lining 4 on the supporting body 2 in the direction of the first cavities 12a, 12, which makes it possible that the locking hook 8a, 8b can be pulled out because of the larger recesses 12a, 12b.

REFERENCE LIST 1 guide rail
2 supporting body
3 active surface
4 slideway lining
5 basic surface
6 slideway surface
7a, 7b recess
8a, 8b locking hook
9a, 9b edge
10a, 10b undercut
11a, 11b cavity
12a, 12b cavity
13 longitudinal axis
14 groove

The invention claimed is:

1. A guide rail for a traction drive, comprising:
a supporting body with an active surface and a first and second recess, wherein a longitudinal axis runs along a length of the supporting body;
a slideway lining configured to contact the active surface, wherein the slideway lining includes: a basic surface in contact with the traction mechanism;
a slideway surface opposite the basic surface;
a first locking hook configured to engage with the first recess to prevent the slideway lining from slipping off the supporting body, wherein the first locking hook is formed on a first edge of the basic surface of the slideway lining and further includes a first undercut configured to interact in a form-fitting manner with the first recess; and
a second locking hook that is formed on a second edge of the basic surface and configured to engage with the second recess to prevent the slideway lining from slipping off the supporting body, wherein the second locking hook includes a second undercut configured to interact in a form-fitting manner with the second recess, wherein the second locking hook is longitudinally offset from the first locking hook relative to a first end of the supporting body along the longitudinal axis.

2. The guide rail of claim 1, wherein the first locking hook and the second locking hook are arranged in longitudinally displaced manner along the slideway lining along the longitudinal axis, wherein the first lock hooking is closer to the first end of the supporting body than the second locking hook.

3. The guide rail of claim 1, wherein the first locking hook includes an L-shaped design configured to partially encompass the active surface of the supporting body.

4. The guide rail of claim 1, wherein the first recess includes a first cavity that is the same size or greater as the first undercut of the first locking hook and a second cavity that is smaller than the second undercut of the second locking hook.

5. The guide rail of claim 1, wherein the slideway lining is configured to be positioned axially on the active surface of the supporting body, wherein the first locking hook and second locking hook penetrate respective first and second cavity simultaneously, and wherein the guide rail includes a form-fitting engagement between the supporting body and the slideway ling that can be implemented by using an axial displacement of the slideway lining on the supporting body in a direction of the second cavity.

6. The guide rail of claim 1, wherein the supporting body is manufactured from metal or polymer material.

7. The guide rail of claim 1, wherein the slideway lining is produced using an injection molding process from polymer material.

8. The guide rail of claim 1, wherein the first locking hook and second locking hook and the first and second recesses are formed identically.

9. A guiderail for a traction drive comprising:
a supporting body including a first surface with a first recess that includes a first corresponding cavity, wherein a longitudinal axis runs along a length of the supporting body; and
a slideway lining configured to contact the first surface, wherein the slideway lining includes a second surface that includes a first locking hook that is formed on a first edge of the second surface and protrudes out from the first surface, wherein the first locking hook is configured to engage with the first recess to prevent the slideway lining from slipping off the supporting body, and a second locking hook that is formed on a second edge of the second surface and protrudes out from the second surface, wherein the second locking hook is configured to engage with a second recess to prevent the slideway lining from slipping off the supporting body, wherein the second edge is opposite the first edge and wherein the first locking hook and the second locking hook are arranged in a longitudinally displaced manner along the slideway lining relative to a first end of the supporting body along the longitudinal axis, wherein the second locking hook is longitudinally offset from the first locking hook relative to a first end of the supporting body along the longitudinal axis.

10. The guiderail for a traction drive of claim 9, wherein the second recess includes a second corresponding cavity.

11. The guiderail for the traction drive of claim 10, wherein the first locking hook is configured to engage with the first recess when the second locking hook is engaged with the second recess.

12. The guiderail for the traction drive of claim 9, wherein the first locking hook includes a groove that is depressed between the first surface and undercut of the locking hook, and the groove is configured to be in contact with the supporting body.

13. The guiderail for the traction drive of claim 9, wherein the first cavity is transverse to a longitudinal axis of the guiderail.

14. The guiderail for the traction drive of claim 9, wherein the supporting body includes a second recess including a second cavity that is smaller than the first cavity, wherein the second cavity is configured to prevent the locking hook from passing through the recess and the first cavity and second cavity are configured to engage with the locking hook simultaneously.

15. The guiderail for the traction drive of claim 9, wherein the first locking hook is configured to secure the slideway lining onto the supporting body.

16. The guiderail for the traction drive of claim 9, wherein the slideway lining includes a slideway surface opposite the second surface, wherein the slideway surface is configured to contact a traction mechanism of an engine.

17. The guiderail for the traction drive of claim 9, wherein the locking hook includes a L-shaped design.

18. The guide rail of claim 9, wherein the first and second recess are arranged in a longitudinally displaced manner along the slideway lining relative to the first end of the supporting body along the longitudinal axis.

* * * * *